US009610573B2

(12) United States Patent
Blanco Brieva et al.

(10) Patent No.: US 9,610,573 B2
(45) Date of Patent: Apr. 4, 2017

(54) PROCESS TO OBTAIN HYDROGEN PEROXIDE, AND CATALYST SUPPORTS FOR THE SAME PROCESS

(75) Inventors: Gema Blanco Brieva, Madrid (ES); Jose Miguel Campos Martin, Madrid (ES); Jose Luis Garcia Fierro, Madrid (ES); Manuel Montiel Argaiz, La Rioja (ES); Roberto Garaffa, Milan (IT); Francine Janssens, Vilvoorde (BE)

(73) Assignee: SOLVAY SA, Brussels (BE)

( * ) Notice: Subject to any disclaimer, the term of this patent is extended or adjusted under 35 U.S.C. 154(b) by 0 days.

(21) Appl. No.: 14/131,919

(22) PCT Filed: Jul. 9, 2012

(86) PCT No.: PCT/EP2012/063356
§ 371 (c)(1),
(2), (4) Date: Jan. 10, 2014

(87) PCT Pub. No.: WO2013/010835
PCT Pub. Date: Jan. 24, 2013

(65) Prior Publication Data
US 2014/0154168 A1 Jun. 5, 2014

(30) Foreign Application Priority Data

Jul. 15, 2011 (EP) ..................................... 11174178

(51) Int. Cl.
| | | |
|---|---|---|
| B01J 31/06 | (2006.01) | |
| B01J 37/22 | (2006.01) | |
| B01J 21/08 | (2006.01) | |
| B01J 23/44 | (2006.01) | |
| B01J 27/053 | (2006.01) | |
| C01B 15/029 | (2006.01) | |

(52) U.S. Cl.
CPC ............. B01J 31/069 (2013.01); B01J 21/08 (2013.01); B01J 23/44 (2013.01); B01J 27/053 (2013.01); B01J 31/06 (2013.01); B01J 37/22 (2013.01); C01B 15/029 (2013.01)

(58) Field of Classification Search
None
See application file for complete search history.

(56) References Cited

U.S. PATENT DOCUMENTS

| | | | |
|---|---|---|---|
| 4,681,751 A | 7/1987 | Gosser | |
| 4,772,458 A | 9/1988 | Gosser | |
| 4,832,938 A | 5/1989 | Gosser | |
| 5,180,573 A * | 1/1993 | Hiramatsu et al. | ........... 423/584 |
| 5,338,531 A | 8/1994 | Chuang | |
| 6,168,775 B1 | 1/2001 | Zhou et al. | |
| 6,447,743 B1 | 9/2002 | Devic et al. | |
| 6,958,138 B1 * | 10/2005 | Devic | ........................... 423/584 |
| 7,045,481 B1 * | 5/2006 | Parasher | ................ B01J 27/053 |
| | | | 502/102 |
| 8,784,769 B2 * | 7/2014 | Chung et al. | ................. 423/584 |
| 2003/0100443 A1 | 5/2003 | Bender et al. | |
| 2006/0198771 A1 | 9/2006 | Devic | |

FOREIGN PATENT DOCUMENTS

| | | |
|---|---|---|
| EP | 492064 A1 | 7/1992 |
| EP | 504741 A1 | 9/1992 |
| EP | 978316 A1 | 2/2000 |
| EP | 1344747 A1 | 9/2003 |
| EP | 1443020 A1 | 8/2004 |
| EP | 2000205 A1 | 12/2008 |
| JP | H04357105 A | 12/1992 |
| JP | H09-290163 A | 11/1997 |
| JP | 2003226905 A | 8/2003 |
| WO | WO 99/41190 A1 | 8/1999 |
| WO | WO 01/05498 A1 | 1/2001 |
| WO | WO 01/05501 A1 | 1/2001 |
| WO | WO 2010131839 A3 * | 1/2011 |

OTHER PUBLICATIONS

Kirk-Othmer—Encyclopedia of Chemical Technology, Third Edition, vol. 13, Raymond Eller et al, Editors—"Ion Exchange", 1981, pp. 678-705, A Wiley-Interscience Publication, John Wiley & Sons, Inc.; 29 pgs.

* cited by examiner

Primary Examiner — Melissa Swain

(57) ABSTRACT

A catalyst support comprising a material functionalized with at least one acid group and at least one halogen atom; and a supported catalyst comprising (i) a catalyst and (ii) the catalyst support comprising the functionalized material, as well as their uses in production of hydrogen peroxide. A process for producing hydrogen peroxide, comprising reacting hydrogen and oxygen in the presence of the supported catalyst comprising the functionalized material, optionally with the addition of an inert gas, in a reactor.

15 Claims, No Drawings

PROCESS TO OBTAIN HYDROGEN PEROXIDE, AND CATALYST SUPPORTS FOR THE SAME PROCESS

CROSS-REFERENCE TO RELATED APPLICATIONS

This application is a U.S. national stage entry under 35 U.S.C. §371 of International Application No. PCT/EP2012/063356 filed Jul. 9, 2012, which claims priority to the European application No. 11174178.1 filed on Jul. 15, 2011, the whole content of this application being incorporated herein by reference for all purposes.

TECHNICAL FIELD

This invention is related to a process to obtain hydrogen peroxide by means of the direct reaction of hydrogen and oxygen in the presence of a solvent and a catalyst. The catalyst comprises a compound of an element selected from groups 7 to 11 of the Periodic Table or a combination of at least one of them supported on a material functionalized simultaneously with acid groups and halogen atoms.

STATE OF THE ART

Hydrogen peroxide is a highly important commercial product widely used as a bleaching agent in the textile or paper manufacturing industry, a disinfecting agent and basic product in the chemical industry and in the peroxide compound production reactions (sodium perborate, sodium percarbonate, metallic peroxides or percarboxyl acids), oxidation (amine oxide manufacture), epoxidation and hydroxylation (plasticizing and stabilizing agent manufacture). It is used for cleaning surfaces in the semiconductor industry, chemical polishing of copper, brass and other copper alloy surfaces, the engraving of electronic circuits, etc.

The industrial method currently most used for producing hydrogen peroxide is the self-oxidation of alkylanthrahydroquinones. This process, which consists of a number of reduction, oxidation, extraction, purification and concentration stages, is highly complex, thus resulting in the investment and variable costs being quite high.

One highly attractive alternative to this process is the production of hydrogen peroxide directly by reacting hydrogen and oxygen in the presence of metal catalysts from the platinum group using explosive concentrations of hydrogen (U.S. Pat. Nos. 4,681,751, 4,772,458, 4,832,938 and 5,338,531) or outside of the explosive limit (International Patent Publication Nos. WO 99/41190, WO 2001/05498, and WO 2001/05501, U.S. Pat. No. 6,168,775). However, in these processes, a high concentration of $H^+$ and $Br^-$ ions is required in the reaction medium in order to obtain high concentrations of hydrogen peroxide. These ions are obtained from strong acids, such as sulfuric, phosphoric, hydrochloric or nitric acids and inorganic bromides. But working with solutions having a high acid concentration requires the use of special equipment to resist the corrosion. Apart from the above, the presence of acid solutions and halogenated ions favors the dissolution of the active metals (platinum group), which results, first of all, in the deactivation of the catalyst and, due to the concentration of dissolved metals being very low, the recovery thereof becomes unfeasible.

To prevent these drawbacks, alternative processes without the presence of halide ions and/or acids in the reaction medium have been proposed. For example, in European patent No. EP 492 064, the use of a catalyst based on palladium supported on a resin functionalized with halogens is proposed, the reaction medium being water with a hydrogen peroxide stabilizing agent, but the concentrations of $H_2O_2$ achieved were only around 0.58% by weight. Another alternative (European patent No. EP 504 741) is the use of palladium catalysts supported on inorganic solids of a superacid type, such as molybdenum, zirconium or tungsten oxides, However, the hydrogen peroxide concentration achieved does not exceed 1% by weight.

WO 01/05501 A1 discloses a supported metal catalyst suitable for the direct manufacture of hydrogen peroxide. The catalyst is subjected to a treatment with an aqueous acid solution containing bromine and bromide ions. This treatment does, however, not result in a functionalization of the support with an acid group and a halogen atom. The support is rather only impregnated with the acid, the bromine and the bromide so that the molecules and atoms may leach off during hydrogen peroxide synthesis. Moreover, according to Example 8 of WO 01/05501 A1 the preparation of hydrogen peroxide still requires the addition of considerable amounts of acid and bromide into the aqueous solution. The hydrogen peroxide thus produced therefore requires a post-treatment of purification to remove the ions by membrane separation or ion exchange.

European patent Nos. EP 978 316, EP 1 344 747 and EP 2 000 205, propose the use of palladium catalysts on solids functionalized with sulfonic groups, but still require free halide promoters, mainly HBr. In consequence, due to the presence of these free halide promoters the use of special equipment to resist the corrosion is necessary and again a post-treatment of purification is required.

DETAILED DESCRIPTION OF THE INVENTION

The object of the invention is to provide a process for producing hydrogen peroxide from hydrogen and oxygen which does not present the above disadvantages and which enables to efficiently obtain hydrogen peroxide. Another object of the invention is to provide a catalyst support, and a supported catalyst suitable for the direct process for producing hydrogen peroxide.

The present invention therefore relates to a catalyst support comprising a material simultaneously functionalized with at least one acid group and at least one halogen atom. In particular, it is related to a catalyst support for direct synthesis of hydrogen peroxide, and a supported catalyst comprising a catalyst and the catalyst support according to the invention. The present invention is also directed to a process for producing hydrogen peroxide, comprising reacting hydrogen and oxygen in the presence of the supported catalyst according to the invention, optionally with the addition of an inert gas, in a reactor.

In the process of the invention, hydrogen and oxygen (as purified oxygen or air) are reacted continuously over a catalyst in the presence of a liquid solvent in a reactor to generate a liquid solution of hydrogen peroxide.

The catalyst comprises a compound of an element selected from groups 7 to 11 of the Periodic Table or a combination of at least one of them supported on a material functionalized simultaneously with acid groups and halogen atoms.

Hydrogen peroxide formation is carried out by means of a direct reaction between hydrogen and oxygen within a solvent in the presence of a catalyst and, optionally, with the addition of an inert gas. Nitrogen, carbon dioxide, helium, argon, etc. can be used as inert gases. The working pressure is normally above atmospheric pressure, and preferably between 1 and 30 MPa. The molar ratio between hydrogen and oxygen ranges from 1/1 to 1/100. The hydrogen concentration in the gas-phase in contact with the reaction medium should preferably be below 4.16% molar, to maintain the operation outside the explosivity limits of the hydrogen and oxygen mixtures.

The reaction of oxygen with hydrogen is performed at temperatures ranging from −10° C. to 100° C., preferably from 10° C. to 75° C.

The liquid medium may be water, or it may be a suitable organic solvent such as alcohols or mixtures thereof. Suitable organic solvents can include various alcohols, aromatics, and esters, or any other organic compounds that are inert in reaction conditions. Solvents are preferably water-soluble alcohols such as methanol, ethanol, n-propanol, isopropanol, tert-butanol, isobutanol and mixtures thereof.

The catalyst comprises a compound of an element selected from groups 7 to 11 of the Periodic Table or a combination of at least one of them supported on a material simultaneously functionalized with acid groups and halogen atoms. The element is selected from the group consisting of palladium, platinum, silver, gold, rhodium, iridium, ruthenium, osmium, and mixtures thereof. Most preferred metal is palladium, optionally in combination with other element cited, i.e., palladium alloy. The amount of metal supported can vary in a broad range, but be preferably comprised between 0.001 and 10% by weight with respect to the weight of the support, more preferably between 0.1 and 5% by weight. The addition of the metal to the support can be performed using any of the known preparation techniques of supported metal catalyst, e.g. impregnation, adsorption, ionic exchange, etc. For the impregnation, it is possible to use any kind of inorganic or organic salt or the metal to be impregnated that is soluble in the solvent used in addition to the metal. Suitable salts are for example acetate, nitrate, halide, oxalate, etc.

One of the essential features of the present invention resides in use of a catalyst support comprising a material functionalized with at least one acid group and at least one halogen atom, along with a catalyst to achieve the purpose of the invention. It has indeed been found that by using the catalyst support according to the invention together with a catalyst hydrogen peroxide is efficiently obtained.

The expression "catalyst support" intends to denote the material, usually a solid with a high surface area, to which a catalyst is affixed and the catalyst support may be inert or participate in the catalytic reactions. The expression "supported catalyst" intends to denote the catalyst which is supported onto the catalyst support.

The expression "functionalized with" intends to denote a covalent bond between the material and the at least one acid group and at least one halogen atom. Due to the covalent bonding of the acid group and the halogen atom to the material of the catalyst support any leaching of those functional groups in liquid phase during hydrogen peroxide synthesis is avoided. Moreover, it has surprisingly been found that it is not necessary to add extra bromide, bromine or acid in the liquid phase thereby avoiding the requirement of post-treatments of the crude hydrogen peroxide solution.

As acid groups sulfonic, carboxylic and dicarboxylic acid groups can be exemplified, such as p-toluene sulfonic groups. The halogen atom can be part of a suitable halogenated group, such as a halogenophenyl group, in particular bromophenyl.

In one embodiment, the simultaneously functionalized material used as support can be an organic resin. Preferably, the resins used in the preparation of the catalyst are produced by homopolymerization of monomers or copolymerization of two or more monomers. Examples of resins suitable as a support in the present invention include olefin polymers such as styrenic, acrylic, methacrylic polymers, their copolymers with divinylbenzene, and mixtures thereof, most preferably styrene-divinylbenzene copolymers. These resins are preferably functionalized with at least one acid group such as sulfonic, carboxylic, dicarboxylic, etc. (Encyclopedia of Chemical Technology Kirk Othmer $3^{rd}$ Edition, Vol. 13, p 678-705, Wiley-Interscience, John Wiley and Sons, 1981). Furthermore the resins used in the present invention can have an inorganic part, e. g. the resin deposited onto an inorganic solid. Brominated styrene-divinylbenzene copolymers are preferred adsorbing resins for use as the catalyst carrier in this invention, and brominated styrene-divinylbenzene copolymers having sulfonic acid groups which function as ion exchange radicals are also preferred.

In another embodiment, the catalyst support according to the invention comprises an inorganic solid functionalized with an acid group and a halogen atom. The inorganic solids, which are in most cases inorganic oxides, generally have a large specific surface area. This specific surface area is determined by the ISO 9277:2010 standard method. Usually, the specific surface area is equal to or greater than 20 $m^2/g$, and in particular equal to or greater than 100 $m^2/g$. The inorganic solids often have a pore volume (determined by ISO 15901-2:2006 standard method) of at least 0.1 mL/g, for instance of at least 0.3 mL/g, in particular of at least 0.4 mL/g. The pore volume is in general at most 3 mL/g, most often at most 2 mL/g, for instance at most 1.5 mL/g. Pore volumes of 0.1-3 mL/g are suitable and those of 0.4-3 mL/g are preferred.

The most appropriate inorganic solids for this invention are the oxides of the elements of groups 2-14 of the Periodic Table of the elements according to the IUPAC. The oxides most employed can be selected from the group comprised of $SiO_2$, $Al_2O_3$, zeolites, $B_2O_3$, $GeO_2$, $ZrO_2$, $TiO_2$, MgO, $CeO_2$, $ZrO_2$, $Nb_2O_5$ and any mixtures thereof The inorganic material most preferred in this invention is silicon oxide (also called silica) or the mixtures thereof with other inorganic oxides. These materials can essentially have an amorphous structure like a silica gel or can be comprised of an orderly structure of mesopores, such as, for example, of types including MCM-41, MCM-48, SBA-15, among others or a crystalline structure, like a zeolite. These inorganic materials functionalized with acid groups can be easily attained at the industrial level, which was well known for the active part of HPLC columns. Functional groups are incorporated into the inorganic materials of the present invention, bonded to their surface. The groups can be incorporated either during the preparation of the same material or in a process sub-sequent to its preparation. The acid group (e.g. p-toluene sulfonic group) and the halogen atom (e.g. bromophenyl group) are covalently bonded to the surface of the inorganic solid, in particular the oxide, for example by silanol functions to a silica surface.

In a certain embodiment, the acid group suitable for the invention may be sulfonic, phosphonic, carboxylic, dicarboxylic acid, or a mixture thereof, preferably sulfonic acid.

In a certain other embodiment, the halogen atom can be fluoride, chloride, bromide, iodide or a mixture thereof, preferably bromide.

The invention is also directed to a supported catalyst comprising (i) a catalyst and (ii) the catalyst support according to the invention. The catalyst support of the invention and the supported catalyst comprising the same can be advantageously used in production of hydrogen peroxide.

In a last embodiment, a process for producing hydrogen peroxide, comprising: reacting hydrogen and oxygen in the presence of the supported catalyst according to the invention, optionally with the addition of an inert gas, in a reactor, is provided. The process of this invention can be carried out in continuous, semi-continuous or discontinuous mode, by the conventional methods, for example, in a stirred tank reactor with the catalyst particles in suspension, in a basket-type stirred tank reactor, etc. Once the reaction has reached the desired conversion levels, the catalyst can be separated by different known processes, such as, for example, by filtration if the catalyst in suspension is used, which would afford the possibility of its subsequent reuse. In this case the amount of catalyst used is that necessary to obtain a concentration 0.01% to 10% by weight regarding the solvent and preferably being 0.1% to 5% by weight.

In this invention, a hydrogen peroxide-stabilizing agent can also be added to the reaction medium. Some of the hydrogen peroxide-stabilizing agents of which mention can be made are inorganic acids such as: phosphoric acid, sulfuric acid, nitric acid, etc.; organic acids such as: aminomethylenephosphoric acid, etc.; amino acids such as: leucine, etc.; phosphoric acid salts such as: sodium pyrophosphate, etc.; chelating agents such as EDTA, etc.; tensoactive agents such as: alkylbenzylsulfonates, etc. These stabilizing agents can be used individually or in combinations of several of them. The preferred stabilizing agents in this invention are aminomethylenephosphoric acid, 1-hydroxyethylene-1,1-diphosphoric acid, ethylene diamine-tetramethylene phosphoric acid, the sodium salts of these compounds and sodium pyrophosphate. The stabilizing agent concentration depends on the type of stabilizing agent and on the concentration of hydrogen peroxide. However, it is preferable to keep the concentration of stabilizing agent low enough to prevent the dissolving of the metal in the catalyst and/or the corrosion of the reactor used. In general, the amount of stabilizing agent added is less than 5000 ppm in relation to the solvent and is preferably less than 500 ppm.

Throughout the description and the claims, the word "comprises" and the variations thereon do not intend to exclude other technical features, additives, components or steps. For the experts in this field, other objects, advantages and characteristics of the invention will be inferred in part from the description and in part from the embodiment of the invention. The following examples are provided for illustrative purposes and are not intended to be limiting of the present invention.

Should the disclosure of any patents, patent applications, and publications which are incorporated herein by reference conflict with the description of the present application to the extent that it may render a term unclear, the present description shall take precedence.

EXAMPLE 1

A catalyst was prepared from commercial powdered silica functionalized with sulfonic and phenyl bromide groups from Silicycle Inc. (Product No. R81230B) (with 2.22 wt. % of S and 1.55 wt. % of Br, 0.8 mL/g pore volume and 500 $m^2$/g BET specific area). Firstly, the solid was washed three times with acetone, using a solvent volume equal to that of the silica. Next, silica support (10 g) was stirred in 125 mL acetone. A solution of palladium acetate (422 mg) in acetone (50 mL) was added, drop-by-drop, to the support suspension. The suspension was stirred for 1 h at room temperature. The solution was filtered and the resulting solid washed and air-dried at 100° C. for 1 h. The palladium content was 2.0 weight %.

EXAMPLE 2

2.5 g of catalyst prepared on Example 1 were placed inside an autoclave with 320 g methanol, the temperature of the mixture having been stabilized at 40° C. The system was pressurized with a mixture of $H_2$:$O_2$:$N_2$ (3.6:55:41.4) with a total flow of 5300 mLN/min up to 5.0 MPa(a) without stirring. Once temperature and pressure were stable, the stirring (1500 rpm) was turned on to start the reaction. After three hours (3 h) of reaction, a hydrogen peroxide concentration of 6.3% by weight was achieved; the hydrogen-to-hydrogen peroxide selectivity was 49%.

EXAMPLE 3

A catalyst was prepared from commercial powdered silica functionalized with phenylsulfonic and bromophenyl groups purchased from Silicycle Inc. (Product No. R81230B) (with 2.18 wt. % of S and 3.1 wt. % of Br, 0.8 mL/g pore volume and 500 $m^2$/g BET specific area). Firstly, the solid was washed three times with acetone, using a solvent volume equal to that of the silica. Next, silica support (10 g) was stirred in 125 mL of acetone. A solution of palladium acetate (422 mg) in acetone (50 mL) was added, drop-by-drop, to the suspension of support. The suspension was stirred for 1 h at room temperature. The suspension was filtered and the resulting solid washed and dried under vacuum at 100° C. for 1 h. The palladium content was 1.8 weight %.

EXAMPLE 4

2.8 g of catalyst prepared on Example 3 were placed inside an autoclave with 320 g of methanol, the temperature of the mixture having been stabilized at 40° C. The system was pressurized with a mixture of $H_2$:$O_2$:$N_2$ (3.6:55:41.4) with a total flow of 5300 mLN/min up to 5.0 MPa(a) without stirring. Once temperature and pressure were stable, the stirring (1500 rpm) was turned on to start the reaction. After 3 h of reaction, a hydrogen peroxide concentration of 6.9% by weight was achieved; the hydrogen-to-hydrogen peroxide selectivity was 46%.

EXAMPLE 5

10 g of Lewatit K2641 (specific surface area BET of 35 $m^2$/g, 0.3 mL/g pore volume and an exchange capacity of 4.8 eq/l) were stirred with 50 mL of tetrahydrofuran and heated at 60° C. After 30 min, 1 ml of a solution of $Br_2$ in tetrahydrofuran (20%) was added to the polymer suspension. After 30 min, $FeCl_3$ (5 mol % based on the amount of bromine) was added to the polymer suspension. The reaction mixture was stirred under reflux temperature for 72 h. The suspension was filtered off and the obtained solid was rinsed with water. The solid was ion-exchanged with a solution of $H_2SO_4$ and then it was filtered off and dried under vacuum for 4 h. This halogenated resin was employed in the catalyst preparation.

A solution of palladium acetate (422 mg) in acetone (50 mL) was added dropwise to the suspension of the halogenated resin (10 g) in acetone (125 ml) under stirring. The suspension was stirred for 1 h at room temperature. The solution was filtered and the resulting solid washed and dried under vacuum at 100° C. for 1 h. The prepared catalyst has a palladium content of 1.5 wt. %.

EXAMPLE 6

3.38 g of catalyst prepared on Example 5 were placed inside an autoclave with 320 g of methanol, the temperature of the mixture having been stabilized at 40° C. The system was pressurized with a mixture of $H_2:O_2:N_2$ (3.6:55:41.4) with a total flow of 5300 mLN/min up to 5.0 MPa(a) without stirring. Once temperature and pressure were stable, the stirring (1500 rpm) was turned on to start the reaction. After 3 h of reaction, a hydrogen peroxide concentration of 7.0% by weight was achieved; the hydrogen-to-hydrogen peroxide selectivity was 46%.

EXAMPLE 7

10 g of Lewatit K2641 (specific surface area BET of 35 $m^2/g$, 0.3 mL/g pore volume and an exchange capacity of 4.8 eq/l) were stirred with 50 mL of tetrahydrofuran and heated at 60° C. After 30 min, 2 ml of a solution of $Br_2$ in tetrahydrofuran (20%) was added to the polymer suspension. After 30 min, $FeCl_3$ (5 mol % based on the amount of bromine) was added to the polymer suspension. The reaction mixture was stirred under reflux temperature for 72 h. The suspension was filtered off and the obtained solid was rinsed with water. The solid was ion-exchanged with a solution of $H_2SO_4$ and then it was filtered off and dried under vacuum for 4 h. This halogenated resin was employed in the catalyst preparation.

A solution of palladium acetate (422 mg) in acetone (50 mL) was added dropwise to the suspension of the halogenated resin (10 g) in acetone (125 ml) under stirring. The suspension was stirred for 1 h at room temperature. The solution was filtered and the resulting solid washed and dried under vacuum at 100° C. for 1 h. The prepared catalyst has a palladium content of 2.0 wt. %.

EXAMPLE 8

2.54 g of catalyst prepared on Example 7 were placed inside an autoclave with 320 g of methanol, the temperature of the mixture having been stabilized at 40° C. The system was pressurized with a mixture of $H_2:O_2:N_2$ (3.6:55:41.4) with a total flow of 5300 mLN/min up to 5.0 MPa(a) without stirring. Once temperature and pressure were stable, the stirring (1500 rpm) was turned on to start the reaction. After 3 h of reaction, a hydrogen peroxide concentration of 8.5% by weight was achieved; the hydrogen-to-hydrogen peroxide selectivity was 54%.

COMPARATIVE EXAMPLE 1

A catalyst was prepared as teach example 2 of EP 2 000 205. The palladium content was 1.98% by weight. 2.5 g of catalyst were placed inside an autoclave with 320 g methanol, the temperature of the mixture having been stabilized at 40° C. The system was pressurized with a mixture of $H_2:O_2:N_2$ (3.6:55:41.4) with a flow of 5300 mLN/min up to 5.0 MPa(a) without stirring.

Once temperature and pressure were stable, the stirring (1500 rpm) was turned on to start the reaction. After two hours (2 h) of reaction, no hydrogen peroxide formation was detected.

COMPARATIVE EXAMPLE 2

A catalyst was prepared as teach example 2 of EP 1 344 747. The palladium content was 1.48% by weight. 3.38 g of catalyst were placed inside an autoclave with 320 g methanol, the temperature of the mixture having been stabilized at 40° C. The system was pressurized with a mixture of $H_2:O_2:N_2$ (3.6:55:41.4) with a flow of 5300 mLN/min up to 5.0 MPa(a) without stirring. Once temperature and pressure were stable, the stirring (1500 rpm) was turned on to start the reaction. After two hours (2 h) of reaction, no hydrogen peroxide formation was detected.

Although this invention has been described broadly and also identifies specific preferred embodiments, it will be understood that modifications and variations may be made within the scope of the invention as defined by the following claims.

The invention claimed is:

1. A supported catalyst, comprising a catalyst and a catalyst support that comprises silica functionalized with at least one acid group and at least one halogen atom, wherein the at least one halogen atom is covalently bonded to the silica.

2. The supported catalyst according to claim 1, wherein said silica has a specific surface area greater than 20 $m^2g$.

3. The supported catalyst according to claim 1 wherein said silica has a pore volume of from 0.1 mL/g to 3 mL/g.

4. The supported catalyst according to claim 1, wherein said at least one acid group is a sulfonic acid group, phosphonic acid group, carboxylic acid group, dicarboxylic acid group, or a mixture thereof.

5. The supported catalyst according to claim 1, wherein said at least one halogen atom is fluoride, chloride, bromide, iodide, or a mixture thereof.

6. The supported catalyst according to claim 1, wherein said catalyst comprises a compound of an element selected from the group consisting of elements of groups 7 to 11 of the Periodic Table and a combination thereof.

7. A method for producing hydrogen peroxide, comprising utilizing the supported catalyst according to claim 1.

8. A process for producing hydrogen peroxide, comprising catalytically reacting hydrogen and oxygen using the supported catalyst according to claim 1.

9. The supported catalyst according to claim 1, wherein the catalyst comprises a compound of an element selected from the group consisting of palladium, platinum, silver, gold, rhodium, iridium, ruthenium, osmium, and alloys thereof.

10. The supported catalyst according to claim 1, wherein the catalyst comprises palladium or a palladium alloy.

11. The process of claim 8, wherein the reacting is conducted with no bromide, bromine, or acid in addition to the at least one acid group and at least one halogen atom of the catalyst support.

12. The supported catalyst of claim 1, wherein the at least one halogen atom is a bromine atom.

13. The supported catalyst of claim 12, wherein the bromine atom is part of a bromophenyl group.

14. A process for producing hydrogen peroxide, comprising catalytically reacting hydrogen and oxygen using a supported catalyst, said supported catalyst comprising a catalyst and a catalyst support, said catalyst comprising palladium or a palladium alloy, and said catalyst support comprising silica functionalized with at least one acid group and at least one bromine atom, wherein the at least one bromine atom is covalently bonded to the silica and the reacting is conducted-with no bromide, bromine, or acid in addition to the at least one acid group and at least one halogen atom of the catalyst support.

15. The supported catalyst according to claim 14, wherein the at least one acid group comprises a sulfonic acid group and the at least one bromine atom is a part of a bromophenyl group.

\* \* \* \* \*